(12) United States Patent
Nocquet et al.

(10) Patent No.: US 9,798,300 B2
(45) Date of Patent: Oct. 24, 2017

(54) PROCESS AND DEVICE FOR RAPID TORREFACTION OF BIOMASS

(71) Applicants: COMMISSARIAT À L'ÉNERGIE ATOMIQUE ET AUX ÉNERGIES ALTERNATIVES, Paris (FR); CENTRE DE COOPERATION INTERNATIONALE EN RECHERCHE AGRONOMIQUE POUR LE DEVELOPMENT, Paris (FR)

(72) Inventors: Timothee Nocquet, Grenoble (FR); Jean-Michel Commandre, Grabels (FR); Capucine Dupont, Grenoble (FR)

(73) Assignees: Commissariat à l'énergie atomique et aux énergies alternatives, Paris (FR); CENTRE DE COOPERATION INTERNATIONALE EN RECHERCHE AGRONOMIQUE POUR LE DEVELOPPEMENT, Paris (FR)

( * ) Notice: Subject to any disclaimer, the term of this patent is extended or adjusted under 35 U.S.C. 154(b) by 448 days.

(21) Appl. No.: 14/367,605

(22) PCT Filed: Dec. 20, 2012

(86) PCT No.: PCT/EP2012/076484
§ 371 (c)(1),
(2) Date: Jun. 20, 2014

(87) PCT Pub. No.: WO2013/092912
PCT Pub. Date: Jun. 27, 2013

(65) Prior Publication Data
US 2014/0338256 A1    Nov. 20, 2014

(30) Foreign Application Priority Data
Dec. 21, 2011 (FR) ...................... 11 62215

(51) Int. Cl.
G05B 13/04 (2006.01)
C10L 9/08 (2006.01)
C10B 53/02 (2006.01)

(52) U.S. Cl.
CPC ............ *G05B 13/041* (2013.01); *C10B 53/02* (2013.01); *C10L 9/083* (2013.01); *C10L 2250/06* (2013.01);
(Continued)

(58) Field of Classification Search
CPC .. C10L 9/083; C10L 2250/06; C10L 2290/60; C10L 2290/58; C10B 53/02; G05B 13/041; Y02E 50/14; Y02E 50/15
See application file for complete search history.

(56) References Cited

U.S. PATENT DOCUMENTS

2007/0266623 A1   11/2007   Paoluccio
2007/0289216 A1*   12/2007   Tsangaris ................... C10J 3/22
                                                               48/197 R (Continued)

OTHER PUBLICATIONS

Kleinschmidt C.P., "Overview of international developments in torrefaction", Central European Biomass Conference, URL: http://www.ieabcc.nl/workshops/task32_2011_graz_torrefaction/Graz%20kleinschmidt%202011.pdf, Total 9 Pages, (Jan. 28, 2011) XP 009159020.

(Continued)

*Primary Examiner* — Shogo Sasaki
(74) *Attorney, Agent, or Firm* — Oblon, McClelland, Maier & Neustadt, L.L.P.

(57) ABSTRACT

A process for controlling a unit for torrefaction of biomass particles including: measurement of a mean diameter of the biomass particles; as a function of the mean diameter, calculation of a maximum torrefaction temperature for which the ratio of a characteristic time of the torrefaction to a characteristic time of the heat transfer at the level of the (Continued)

particles is equal to a minimum value; adjusting the torrefaction temperature to a value less than or equal to the maximum torrefaction temperature; adjusting the torrefaction time to a value such that the final yield by weight of the torrefaction is equal to a predefined target value.

15 Claims, 3 Drawing Sheets

(52) U.S. Cl.
CPC ....... *C10L 2290/58* (2013.01); *C10L 2290/60* (2013.01); *Y02E 50/14* (2013.01); *Y02E 50/15* (2013.01)

(56) References Cited

U.S. PATENT DOCUMENTS

| | | | | |
|---|---|---|---|---|
| 2008/0109100 A1* | 5/2008 | Macharia | ............ | C10L 1/02 700/110 |
| 2008/0109200 A1* | 5/2008 | Bartee | ............ | C12P 7/06 703/12 |
| 2008/0167852 A1* | 7/2008 | Bartee | ............ | C12P 7/06 703/11 |
| 2008/0209807 A1* | 9/2008 | Tsangaris | ............ | C10J 3/20 48/89 |
| 2009/0020456 A1* | 1/2009 | Tsangaris | ............ | C10G 2/30 208/133 |
| 2010/0082139 A1* | 4/2010 | Macharia | ............ | G05B 17/02 700/103 |
| 2010/0082140 A1* | 4/2010 | Macharia | ............ | G06Q 30/0283 700/103 |
| 2010/0154304 A1* | 6/2010 | Tsangaris | ............ | C10J 3/24 48/74 |
| 2011/0036014 A1* | 2/2011 | Tsangaris | ............ | C01B 3/22 48/62 R |
| 2012/0093701 A1 | 4/2012 | Paoluccio | | |
| 2012/0124901 A1 | 5/2012 | Paoluccio | | |
| 2014/0298716 A1 | 10/2014 | Marty et al. | | |

OTHER PUBLICATIONS

Bergmand, P., et al., "Torrefaction for Biomass Upgrading", 14$^{th}$ European Biomass Conference, pp. 206-209, (Oct. 17-21, 2005) XP 008101852.

International Search Report Issued Mar. 27, 2013 in PCT/EP12/076484 Filed Dec. 20, 2012.

* cited by examiner

PROCESS AND DEVICE FOR RAPID TORREFACTION OF BIOMASS

FIELD OF THE INVENTION

The present invention relates to the field of thermochemical biomass recovery.

It relates to a biomass particle heat treatment process, of the type known as torrefaction. Such a treatment is suitable for preparing a biomass load with a view to facilitating the fractionation thereof by grinding to prepare same for:
   gasification in an entrained flow reactor;
   co-combustion with coal.

The term "particles" denotes any type of solid biomass pieces, grains, chips, fragments or debris.

The term biomass denotes any type of material of plant, animal or fungal origin, suitable for becoming an energy source by means of combustion.

The invention relates particularly, but not exclusively, to the torrefaction of lignocellulosic biomass, such as wood.

It particularly relates to a process for controlling a biomass particle torrefaction unit wherein the particles are torrefied for a torrefaction time $t_r$ in a fluid, preferably a gas, heated to a torrefaction temperature $T_g$.

This invention also relates to a torrefaction process using this control process, a control device suitable to using said control process, and a torrefaction unit comprising this device.

STATE OF THE RELATED ART

In a conventional gasification process, the biomass is pretreated (dried and coarsely ground, to a size in the region of one centimeter), and then converted in a gasifier to synthetic gas, essentially $H_2$ and CO. This gas may subsequently be converted by means of a catalytic reaction into liquid fuel such as Fischer Tropsch diesel fuel, methanol/DME or alcohols, dihydrogen, or gaseous fuel such as that known as Synthetic Natural Gas.

A particularly advantageous gasification reactor is the entrained flow reactor. Operating at high temperatures, typically between 1000 and 1600° C., with residence times of a few seconds, it makes it possible to obtain a practically tar-free gas in the synthetic gas. Under these conditions, heat and material transfers are intense, and complete biomass conversion involves injecting same in the form of particles less than 1 mm in size, and preferably in the region of 100 μm to 500 μm.

However, it is difficult and thus expensive to reduce the size of biomass particles below one centimeter, particularly in the case of lignocellulosic biomass, due to the fibrous nature of this biomass. This fibrous nature is particularly conveyed by the presence of microfibrils liable to promote undesirable agglomeration of the ground particles.

One solution consists of pre-grinding the biomass so as to obtain particles wherein the characteristic size is in the region of one centimeter, torrefying these particles, and grinding same until smooth particles with a substantially spherical shape wherein the characteristic size is in the region of 100 μm to 500 μm are obtained, to finally inject these particles into the entrained flow reactor.

In the second proposed application, the biomass may be recovered in thermal power plants by co-combustion with coal. The current technical difficulties are similar to those encountered with the entrained flow reactor, since the biomass needs to be injected with the coal in atomised form. Torrefying the biomass load enables the injection thereof into the reactor and the harmonisation of the properties thereof with those of coal, enabling the use of thermal power plants designed for coal. Torrefaction thus represents a biomass pre-treatment solution for this process.

Torrefaction is generally considered by the scientific community as a mild biomass heat treatment, between approximately 200° C. and 300° C., in an oxygen-free or depleted atmosphere, which generally lasts for some tens of minutes to several hours. During this thermal conversion, the biomass particles lose mass at a quasi-constant volume as the reaction progresses. This renders the particles mechanically weaker, and thus increases the grindability thereof. This also alters the fibrous nature of the biomass, and renders the torrefied particles smoother and more spherical, facilitating the injection thereof in the gasification reactor.

Moreover, during torrefaction, gases are emitted. These gases include non-condensable species, i.e. gaseous at ambient temperature, and condensable species which are released in gaseous form during the heat treatment and subsequently condense at ambient temperature: these are essentially water vapour, carbon dioxide and acetic acid. This gives rise to a decrease in the O/C and H/C ratios of the solid, and an increase in the energy density thereof.

Torrefaction makes it possible to obtain a material that is easier to transport and store: the torrefied biomass is more energy-dense than the raw biomass, more hydrophobic and has a higher resistance to biological degradations.

However, the time required for conventional torrefaction treatment generates industrial costs for which the possibility of reducing same is desirable.

This time decreases when the torrefaction temperature $T_g$, i.e. the temperature of the fluid in which the biomass particles are immersed in the torrefaction reaction, increases.

However, such an increase in the torrefaction temperature $T_g$ generally results in a reduction in the homogeneity of the particle sizes obtained after torrefaction and grinding. In other words, such an increase in the torrefaction temperature $T_g$ generally induces spreading of the torrefied and ground particle size distribution. For this reason, obtaining particles of sufficiently small sizes for applications such as those mentioned above, requires more elaborate grinding and thus proves to be more costly.

DESCRIPTION OF THE INVENTION

The aim of the invention is particularly that of providing a simple, economical and effective solution for this problem, and particularly relates to a process for the torrefaction of biomass particles at an optimised temperature to minimise the process time while retaining satisfactory grindability of the torrefied biomass particles.

For this purpose, the invention relates to a process for controlling a torrefaction unit for the torrefaction of biomass particles for a torrefaction time $t_r$ in a gas heated to a torrefaction temperature $T_g$, said process being characterised in that it comprises successive steps for:
   measuring a mean diameter $d_p$ of the biomass particles;
   according to the mean diameter $d_p$ of the biomass particles, computing a maximum torrefaction temperature $T_g^{max}$ for which a ratio H of a characteristic torrefaction reaction time to a characteristic heat transfer time in the biomass particles is equal to a predefined minimum value $H^{min}$;
   setting the torrefaction temperature $T_g$ of said fluid to a value less than or equal to said maximum torrefaction temperature $T_g^{max}$;

setting the torrefaction time $t_r$ to a value such that the final mass yield R of the torrefaction is equal to a predefined target value.

The term "characteristic time" denotes a time required for the parameter in question to reach a certain percentage of the maximum value thereof. This percentage is routinely chosen as equal to 63.2%.

The term "final mass yield" denotes the ratio of the mass of the particles after torrefaction to the mass of the particles before torrefaction, these particles having been dried to constant mass (dry mass), for example according to the standard XP CEN/TS 14774-1. This yield thus decreases as the torrefaction reaction progresses.

It has been observed that an increase in the homogeneity of the torrefaction reaction in each biomass particle makes it possible to reduce the dispersion of the respective torrefied and ground particle size distribution.

The control process according to the invention makes it possible to determine the highest torrefaction temperature which is compatible with a minimal degree of homogeneity of the torrefaction reaction in the particles. This homogeneity indeed improves according to the rapidity of the heat transfer in the biomass particles compared to the torrefaction reaction. The homogeneity of this reaction may thus be estimated based on the value of the ratio H mentioned above.

Once this temperature has been determined, the torrefaction time suitable for achieving a predetermined final mass yield is determined.

The process according to the invention thus makes it possible to maximise the torrefaction temperature and thus minimise the duration of this heat treatment, while ensuring satisfactory efficiency of this treatment. This reduction in time may translate into a considerable reduction in the cost of this treatment.

It should be noted that the process according to the invention advantageously further comprises subsequent successive steps for:
starting torrefaction at the torrefaction temperature $T_g$ set previously;
stopping torrefaction after a time equal to the torrefaction time $t_r$ set previously.

Furthermore, the torrefaction temperature $T_g$ is advantageously set equal to said maximum torrefaction temperature $T_g^{max}$.

This makes it possible to optimise the torrefaction reaction rate, and thus maximise the time saved and cost reduction enabled by the invention.

The predefined minimum value $H^{min}$ of said ratio H is advantageously greater than or equal to 2, preferably greater than or equal to 5, and more preferentially greater than or equal to 10.

As explained above, the choice of the minimum value of this ratio H determines the degree of homogeneity of the torrefaction reaction, and thus the degree of grindability of the torrefied particles.

The target value of the final mass yield R of the torrefaction is preferably greater than or equal to 60%, preferentially 70%, and more preferentially 80%.

These final mass yield values ensure the viability of the torrefaction in terms of energy balance.

The torrefaction temperature $T_g$ is within the range 300° C.-400° C., preferentially in the range 300° C.-350° C., and more preferentially in the range 325° C.-350° C.

Such temperatures generally make it possible to achieve relatively rapid torrefaction while retaining a satisfactory degree of grindability of the torrefied particles.

The torrefaction time $t_r$ is less than 15 minutes, preferably less than 10 minutes, more preferentially less than 5 minutes.

These times make it possible to obtain the yield levels mentioned above for torrefaction temperatures within the above-mentioned ranges.

In one preferred embodiment of the invention, the maximum torrefaction temperature $T_g^{max}$ is determined according to the minimum value $H^{min}$ of said ratio using the formula:

$$H^{min} = \frac{1/k_t}{\frac{\rho_p Cp_p d_p^2}{36\lambda_{eff,p}}}$$

wherein:
$k_t$ is a reaction rate constant for the torrefaction reaction, considered to be a first-order reaction;
$\rho_p$ is the volumetric mass density of the biomass;
$Cp_p$ is the specific heat of the biomass;
$\lambda_{eff,p}$ is the effective thermal conductivity of the biomass.

The above formula expresses the ratio of the characteristic torrefaction reaction time to the characteristic internal heat transfer time by conduction or radiation in the biomass particles.

In a second preferred embodiment of the invention, the maximum torrefaction temperature $T_g^{max}$ is determined according to said minimum value $H^{min}$ of said ratio using the formula:

$$H^{min} = \frac{1/k_t}{\frac{\rho_p Cp_p d_p^2}{36\lambda_{eff,p}} + \min\left(\frac{\rho_p Cp_p d_p}{6h_{conv}}; \frac{\rho_p Cp_p d_p}{6\omega_p \sigma(T_g^{max} + T_p)(T_g^{max2} + T_p^2)}\right)}$$

wherein:
$k_t$ is a reaction rate constant for the torrefaction reaction, considered to be a first-order reaction;
$\rho_p$ is the volumetric mass density of the biomass;
$Cp_p$ is the specific heat of the biomass;
$\lambda_{eff,p}$ is the effective thermal conductivity of the biomass;
$\omega_p$ is the emissivity of the biomass;
$h_{conv}$ is the external heat transfer coefficient between the biomass and said fluid;
$\sigma$ is the Stefan-Boltzmann constant;
$T_p$ is the initial temperature of the biomass particles before torrefaction.

The above formula expresses the ratio of the characteristic torrefaction reaction time to the sum of the characteristic internal heat transfer time by conduction or radiation in the biomass particles and the minimum of the respective external characteristic times, i.e. with the fluid, by convection and by radiation.

This formula thus enables a superior estimation to the formula used in the first embodiment of the invention.

In this second embodiment of the invention, the external heat transfer coefficient $h_{conv}$ is preferably determined using the Ranz-Marshall correlation, by means of the formula:

$$h_{conv} = \frac{\lambda_g}{d_p}(2 + 0.6Re_p^{1/2} \cdot Pr^{1/2})$$

wherein:

Re$_p$ is the Reynolds number determined using the formula:

$$Re_p = \frac{\rho_g \times V_g \times d_p}{\mu_g};$$

Pr is the Prandtl number determined using the formula:

$$Pr = \frac{\mu_g \times Cp_g}{\lambda_g};$$

where:
$\rho_p$ is the volumetric mass density of the fluid;
$\mu_g$ is the viscosity of the fluid;
$\lambda_g$ is the thermal conductivity of the fluid;
$Cp_g$ is the specific heat of the fluid;
$V_g$ is a mean velocity of the fluid.

Furthermore, the reaction rate constant $k_r$ is determined on the basis of a kinetic model of the torrefaction reaction, and is dependent on the type of torrefied biomass.

As a general rule, the torrefaction time $t_r$ is advantageously determined according to the torrefaction temperature $T_g$ and the target value of the final mass yield R of the torrefaction, by means of predetermined experimental correlation data.

The torrefaction time may particularly be determined on the basis of an extrapolation of said experimental data.

The invention also relates to a process for torrefaction of biomass particles, preferably lignocellulosic particles, for a torrefaction time $t_r$ in a gas heated to a torrefaction temperature $T_g$ in a torrefaction unit, comprising control of the torrefaction unit by means of a control process as described above.

This process is advantageously applied to biomass particles of which the mean diameter $d_p$ is less than 40 mm, preferably less than 20 mm, more preferentially less than 10 mm.

In one particularly advantageous application of this process, the biomass consists of wood. The process according to the invention thus makes it possible to avoid the use of additives such as oil.

Furthermore, said gas is preferably an inert gas, such as dinitrogen N2.

The invention also relates to a device for controlling a torrefaction unit for the torrefaction of biomass particles for a torrefaction time $t_r$ in a fluid heated to a torrefaction temperature $T_g$, the control device being characterised in that it comprises:
  means for measuring a mean diameter $d_p$ of the biomass particles;
  first computing means designed to determine, according to the mean diameter $d_p$ of the biomass particles, a maximum torrefaction temperature $T_g^{max}$ for which the ratio H of a characteristic torrefaction reaction time to a characteristic heat transfer time in the biomass particles is equal to a predefined minimum value $H^{min}$;
  first control means designed to set said torrefaction temperature $T_g$ to a value less than or equal to said maximum torrefaction temperature $T_g^{max}$;
  second computing and control means designed to set said torrefaction time $t_r$ to a value such that the final mass yield R of the torrefaction is equal to a predefined target value.

Said computing means enable reliable and rapid use of the process according to the invention.

Said control device preferably comprises means for pre-setting the minimum value $H^{min}$ of said ratio H and/or for pre-setting the final mass yield R of the torrefaction.

These values may thus be easily modified before each biomass particle torrefaction treatment.

The invention finally relates to a torrefaction unit for the torrefaction of biomass particles for a torrefaction time $t_r$ in a gas heated to a torrefaction temperature $T_g$, comprising a control device such as that described above, along with heating means for heating said gas to the torrefaction temperature $T_g$ set by said device, for a time equal to the torrefaction time $t_r$ set by this device.

BRIEF DESCRIPTION OF THE FIGURES

The invention will be understood more clearly and further details, advantages and features thereof will emerge on reading the following non-limiting description with reference to the appended figures wherein.

Throughout these figures, identical references may denote identical or similar elements.

DETAILED DESCRIPTION OF PREFERRED EMBODIMENTS

Figures 1, 1A:
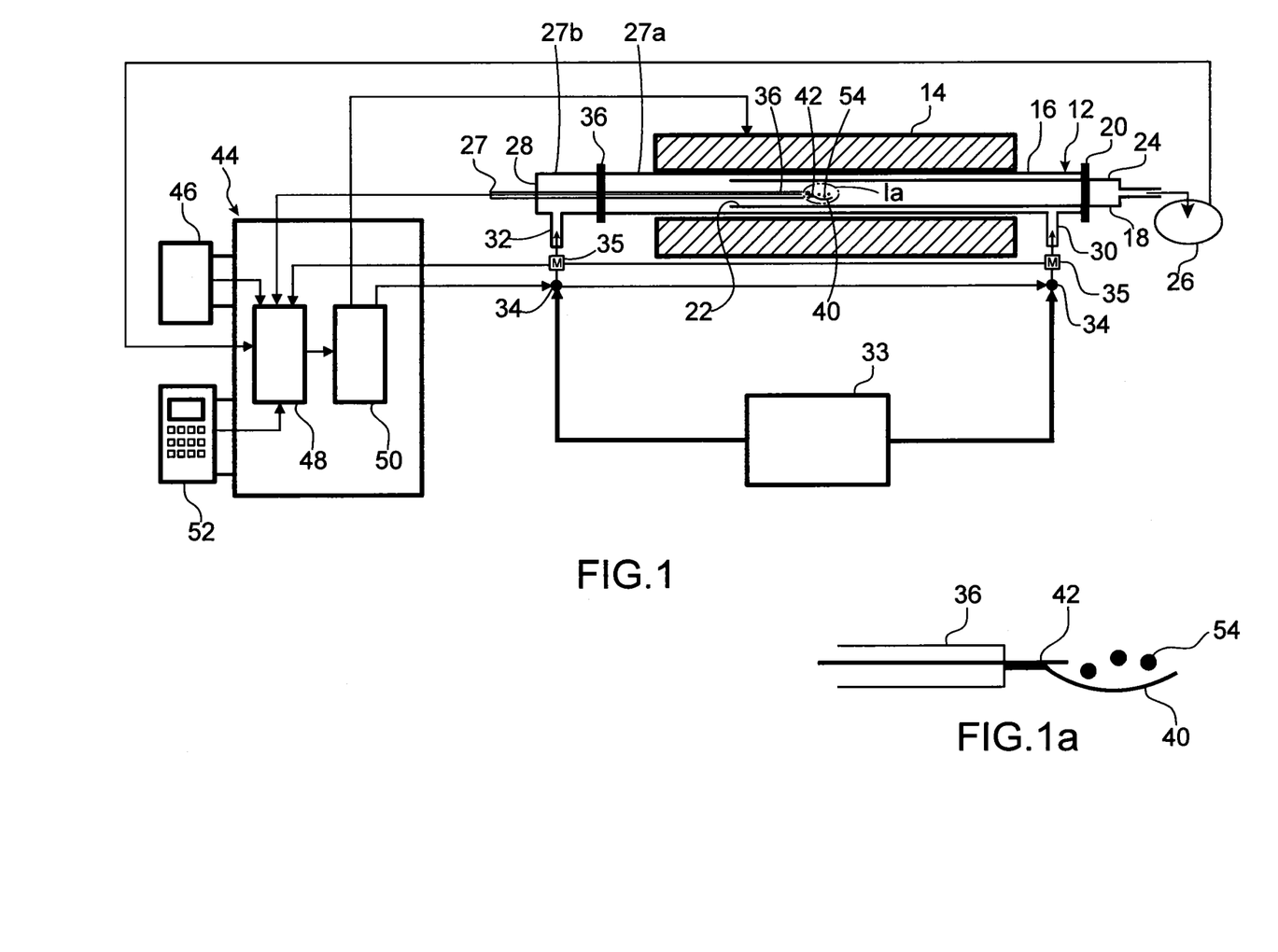
FIG. 1 is a partial schematic longitudinal sectional view of a torrefaction unit according to one preferred embodiment of the invention.
FIG. 1a is a view on a larger scale of the detail la in FIG. 1.

FIG. 1 represents a laboratory torrefaction unit 10, intended for the torrefaction of solid biomass particles, for example wood, and comprising a tubular reactor 12, along with a heating element 14 formed from resistors encompassing the reactor 12 and capable to reaching up to approximately 1000° C.

The reactor 12 is of the double-jacketed type, and thus comprises an outer tube 16 made of quartz and an inner tube 18 also made of quartz and extending inside the outer tube 16 from a first 20 of the ends thereof to a median part thereof, wherein the inner tube 18 has an open end 22. The opposite end 24 of the inner tube projects beyond the outer tube 16 and is connected to an analysis device 26. The first end 20 of the outer tube 16 is closed around the inner tube 18. The outer tube 16 comprises a first part 27a comprising the first end 20 of the tube 16 and open at the opposite end thereof, along with a second removable part 27b comprising the opposite end 28 of the tube 16. The second part 27b of the tube 16 is suitable for being connected to the first part 27a of the tube by means of a coupling 27 as illustrated in FIG. 1.

The outer tube 16 comprises, in the vicinity of each of the opposite ends 20 and 28 thereof, a coupling 30, 32 to a pressurised gas source 33, such as dinitrogen N2. Each coupling 30, 32 is connected to monitoring means 34 and means 35 for measuring the gas flow rate entering the reactor 12.

The second end 28 of the outer tube 16 is provided with an orifice for the passage of a rod 36 having at the end thereof arranged inside the reactor 12, a sample-holder 40 equipped with a thermocouple 42. The rod 36 is movable in translation along the longitudinal direction, between a retracted position wherein the sample-holder 40 is near the second end 28 of the outer tube 16 and is situated outside the hole of the heating element 14, and an extended position wherein the sample-holder is removed from the second end 28 of the outer tube 16 and is situated in the hole of the heating element 14.

In the example illustrated, the length of the outer tube 16 is approximately 1290 mm and that of the inner tube 18 is approximately 850 mm. Furthermore, the internal diameter of the outer tube 16 is approximately 70 mm and that of the inner tube 18 is approximately 55 mm. The longitudinal span of the heating element 14 is approximately 620 mm.

The torrefaction unit 10 further comprises a control device 44, represented very schematically in FIG. 1, and connected, at the input, to the flow rate measuring means 35, to the thermocouple 42, to temperature measuring means integrated in the heating element 14, and to the analysis device 26, and, at the output, to the flow rate monitoring means 34 and to the heating element 14.

The control device 44 comprises a device 46 for measuring the mean diameter $d_p$ of the biomass particles. This measuring device may be of any conventional type, operating for example using optical measurements and image processing algorithms, or using mechanical sensors. This device may alternatively adopt the form of an input unit for entering a value of the diameter previously measured by a human operator.

The control device 44 also comprises a computing unit 48 designed to determine, according to the mean diameter $d_p$ and the initial temperature $T_p$ measured for the biomass particles, a maximum torrefaction temperature $T_g^{max}$ for which the ratio H of a characteristic torrefaction reaction time to a characteristic heat transfer time in the biomass particles is equal to a predefined minimum value $H^{min}$.

The ratio H is defined using the formula:

$$H = \frac{1/k_t}{\frac{\rho_p Cp_p d_p^2}{36\lambda_{eff,p}} + \min\left(\frac{\rho_p Cp_p d_p}{6h_{conv}}; \frac{\rho_p Cp_p d_p}{6\omega_p \sigma(T_g+T_p)(T_g^2+T_p^2)}\right)}$$

wherein:
$k_t$ is a reaction rate constant for the torrefaction reaction, considered to be a first-order reaction;
$\rho_p$ is the volumetric mass density of the biomass particles;
$Cp_p$ is the specific heat of these particles;
$\lambda_{eff,p}$ is the effective thermal conductivity of these particles, given by the formula:
$\lambda_{eff,p} = \epsilon_p \lambda_g + (1-\epsilon_p)\lambda_p$ where $\epsilon_p$ is the porosity of the biomass particles and $\lambda_p$ is the thermal conductivity of these particles;
$\omega_p$ is the emissivity of these particles;
$h_{conv}$ is the external heat transfer coefficient between these particles and the inert gas;

$\sigma$ is the Stefan-Boltzmann constant equal to $5.67 \cdot 10^{-8}$ $W \cdot m^{-2} \cdot K^{-4}$.

It should be noted that the numerator of the above formula corresponds to the characteristic torrefaction reaction time whereas the denominator corresponds to the characteristic heat transfer time in the biomass particles. The first term of this denominator corresponds to a characteristic heat transfer time by conduction and radiation in the biomass particles whereas the second term corresponds to the minimum characteristic external heat transfer times by convection and radiation respectively.

The computing unit 48 determines the reaction rate constant $k_t$ on the basis of prerecorded data for one or a plurality of types of biomass to be torrefied, as will emerge more clearly hereinafter.

The computing unit 48 determines the external heat transfer coefficient $h_{conv}$ on the basis of the Ranz-Marshall correlation, using the formula:

$$h_{conv} = \frac{\lambda_g}{d_p}(2 + 0.6 Re_p^{1/2} \cdot Pr^{1/2})$$

wherein:
$Re_p$ is the Reynolds number determined using the formula:

$$Re_p = \frac{\rho_g \times V_g \times d_p}{\mu_g};$$

Pr is the Prandtl number determined using the formula:

$$Pr = \frac{\mu_g \times Cp_g}{\lambda_g};$$

and where:
$\rho_g$ is the volumetric mass density of the inert gas;
$\mu_g$ is the viscosity of this gas;
$\lambda_g$ is the thermal conductivity of this gas;
$Cp_g$ is the specific heat of this gas;
$V_g$ is a velocity of this gas relative to the biomass particles.

The velocity $V_g$ is determined using the formula:

$$V_g = D_g / S_{18}$$

wherein $D_g$ is the total gas flow rate injected via the couplings 30 and 32, which may be for example in the region of 1 L/min, and $S_{18}$ is the cross-section of the inner tube 18.

The control device 44 further comprises a monitoring unit 50 designed to set the torrefaction temperature $T_g$ to a value less than or, preferably, equal to the maximum torrefaction temperature $T_g^{max}$ determined by the computing unit 48.

Furthermore, said computing unit 48 is designed to compute a torrefaction time $t_r$ for which, given the torrefaction temperature $T_g$, the final mass yield R of the torrefaction is equal to a predefined value.

For this purpose, the computing unit 48 comprises a memory wherein experimental data giving the final mass yield R corresponding to various triplets {torrefaction temperature $T_g$; torrefaction time $t_r$; mean diameter $d_p$ of the biomass particles} are recorded. The computing unit is thus designed to determine the torrefaction time $t_r$ by extrapolation on the basis of these pre-recorded data.

The monitoring unit 50 is designed to discontinue the torrefaction treatment in the reactor 12 after the torrefaction time $t_r$ determined by the computing unit 48.

The control device 44 further comprises an input unit 52 for entering the minimum value $H^{min}$ of the above-mentioned ratio H and the final mass yield R sought for torrefaction.

Preferably, the input unit further allows the entry of the type of biomass to be torrefied, in which case the computing unit comprises a memory wherein the values of the parameters relating to various types of biomass, i.e. the reaction rate constant $k_t$, the volumetric mass density $\rho_p$, the specific heat $Cp_p$, the effective thermal conductivity $\lambda_{eff,p}$, and the emissivity $\omega_p$, are recorded. Alternatively, the input unit may be designed to enable direct entry of the respective values of these parameters or of parameters suitable for determining same.

The same applies for the parameters relating to the inert gas, i.e. the volumetric mass density $\rho_g$ thereof, the viscosity $\mu_g$ thereof, the thermal conductivity $\lambda_g$ thereof, and the specific heat $Cp_g$ thereof.

The torrefaction unit 10 described above is a unit intended to be used for experimental purposes in a laboratory, for small volumes of biomass. However, the above description may be readily adapted by those skilled in the art to any type of torrefaction unit, particularly for industrial purposes, for the torrefaction of large volumes of biomass.

The torrefaction unit 10 described above may be used as follows for the torrefaction of a sample 54 of biomass particles.

Firstly, the sample 54 may optionally be weighed after drying to constant mass.

After starting up the control device 44, an operator enters, by means of the input device 52, the type of biomass to be torrefied, the minimum value $H^{min}$ of the above-mentioned ratio H, and the value of the final mass yield R sought for torrefaction.

The computing unit then determines the maximum torrefaction temperature $T_g^{max}$ compatible with these values, along with the corresponding torrefaction time $t_r$.

The control device 44 then causes the start-up of the heating element 14 and the temperature regulation thereof using temperature measurement means integrated in this heating element.

Furthermore, the second part 27b of the outer tube 16 being detached from the first part 27a thereof, the operator arranges the sample 54 on the sample-holder 40 which is then situated outside the reactor 12. The operator then connects the second part 27b of the outer tube 16 to the first part 27a thereof, and arranges the sample-holder 40 on the side of the second end 28 of the outer tube, outside the region encompassed by the heating element 14, by holding the rod 36 in the retracted position thereof.

The control device 44 controls the flow rate monitoring means 34 and the inert gas source 33 such that pressurised gas constantly enters via the couplings 30 and 32 of the outer tube 16 of the reactor 12. A corresponding gas flow is thus discharged to the analysis device 26, so as to drain the reactor 12.

The gas injected into the reactor 12 via the coupling 30 near the first end 20 of the outer tube 16 is heated between the outer tube 16 and the inner tube 18 before reaching a median region of the reactor 12 encompassed by the heating element 14. The gas injected into the reactor 12 via the other coupling 32 is suitable for immersing the sample 54 so as to maintain same at the initial temperature thereof before the start of torrefaction and thus prevent the heat treatment of the sample 54 from being initiated in an uncontrolled manner. It should be noted that the gas flow rate injected via this other coupling 32 is preferably equal to one-third of the total gas flow rate injected into the reactor 12 via the two couplings 30 and 32. The control device 44 regulates the heating element 14 such that the temperature of the gas inside the reactor 12, determined by the temperature measuring means integrated in the heating element 14, remains constantly equal to torrefaction temperature $T_g$ which may be less than, or preferably equal to the maximum torrefaction temperature $T_g^{max}$ determined previously.

Once the analysis device 26 indicates to the control device 44 that the dioxygen level present in the reactor 12 is sufficiently low, such that this reactor is filled with an inert gaseous medium suitable for torrefaction, and if the gas temperature has reached the torrefaction temperature $T_g$, the rod 36 is moved in translation to the extended position thereof illustrated in FIG. 1, either manually by a human operator, or automatically by means of a robotic device provided for this purpose (not shown in FIG. 1).

The temperature regulation of the heating element 14 may as such be based on a temperature measurement made by the thermocouple 42 arranged as close as possible to the sample 40 for maximum precision. The temperature measurement may obviously be made by any other means within the scope of the present invention.

After a time equal to the torrefaction time $t_r$ determined previously, the rod 36 is moved to the retracted position thereof, either manually by the human operator, or automatically by means of the above-mentioned robotic device.

One particular application of the torrefaction process described above to the torrefaction of beech particles will now be described.

For this material, the values of the parameters required for computing the ratio H are for example:

$\rho_p = 710$ Kg·m$^{-3}$;
$Cp_p = 1522$ J·Kg$^{-1}$K$^{-1}$;
$\lambda_p = 0.112$ W·m$^{-1}$K$^{-1}$;
$\epsilon_p = 0.7$;
$\omega_p = 0.9$.

Furthermore, the reaction rate constant $k_t$ is determined according to the studies by Di Blasi and Branca presented in the article Di Blasi, C. and C. Branca (2001): "Kinetics of Primary Product Formation from Wood Pyrolysis.", Industrial & Engineering Chemistry Research 40(23): 5547-5556.

This reaction rate constant $k_t$ is thus estimated using the formula:

$$k_t = 4.38 \cdot 10^9 e^{-141200/R \cdot T_g}$$

The gas used being dinitrogen N2, the values of the corresponding parameters are well known to those skilled in the art. It is noted that the thermal conductivity of this gas is obtained by the following formula:

$$\lambda_g = \frac{\mu_g}{M_g}\left[1.3(Cp_g M_g - R) + 14644 - \frac{2928.8}{T_g/Tc_g}\right]$$

wherein:

$M_g$ is the molar mass of the gas equal to 0.028 kg/mol;
$R$ is the ideal gas constant equal to 8.3145 J/(mol·K);
$Tc_g$ is the critical temperature of the gas (−146° C.);
$Cp_g$ is the specific heat of the gas obtained using the formula:

$$Cp_g = \frac{6.5 + 0.001 T_g}{M_g} * 4.18$$

Figure 2:
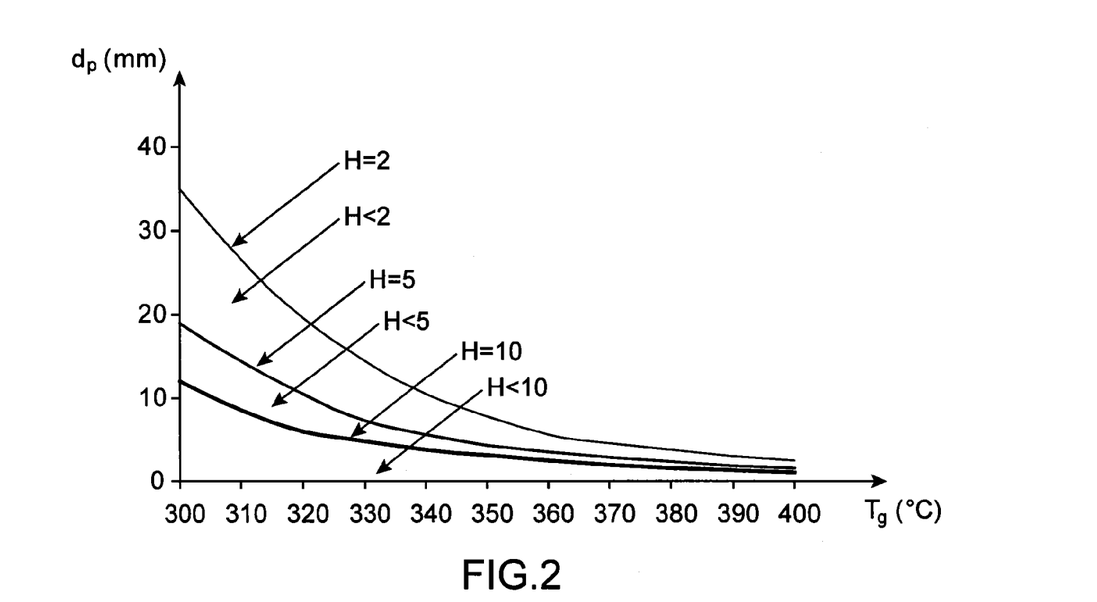
FIG. 2 is a graph illustrating the relationship between the maximum torrefaction temperature $T_g^{max}$ and the diameter $d_p$ of the biomass particles for three values of the ratio H.

FIG. 2 represents three curves illustrating the relationship between the torrefaction temperature $T_g$ and the mean diameter $d_p$ of the biomass particles such that the ratio H calculated using the above formula is respectively equal to 2, 5 and 10, in the case of beech particles torrefied in dinitrogen N2, these particles being initially at a temperature $T_p=25°$ C.

This type of graph illustrates the principle used in the control device 44 described above consisting of determining the maximum torrefaction temperature $T_g^{max}$ guaranteeing a predefined minimum degree of homogeneity $H^{min}$, according to the mean diameter $d_p$ of the biomass particles.

Figure 3:
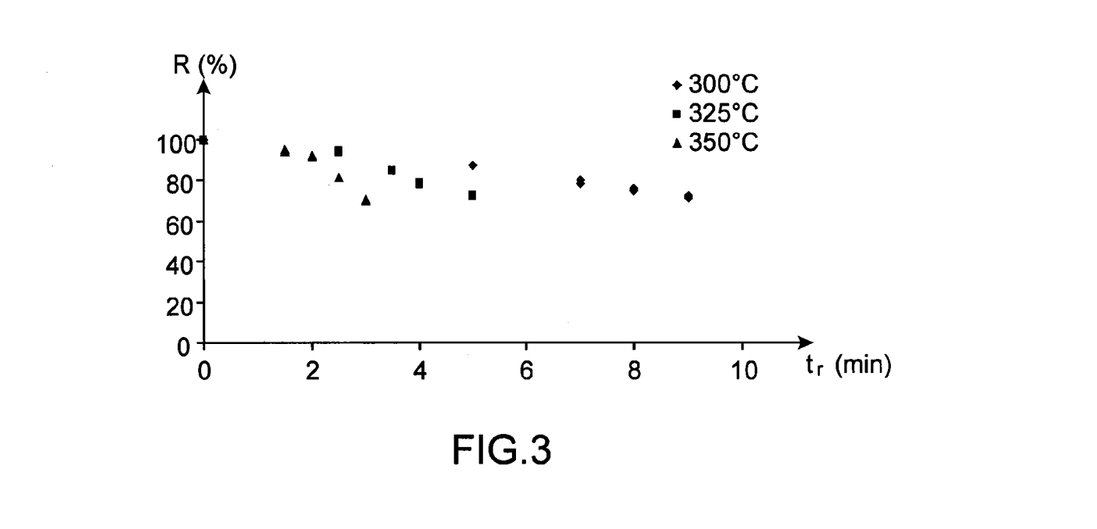
FIGS. 3 and 4 are graphs illustrating, for two biomass particle diameter values $d_p$, the progression of the final mass yield R of the torrefaction as a function of the torrefaction time $t_r$, for three torrefaction temperature values $T_g$.
Figure 4:
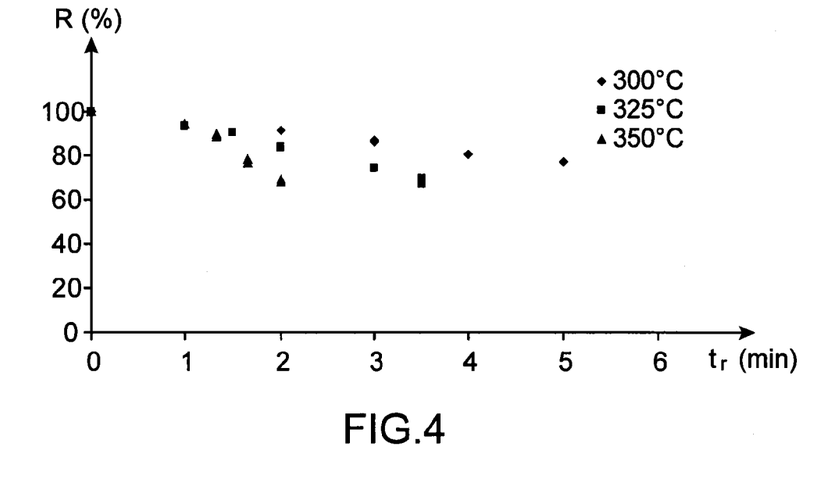

FIGS. 3 and 4 illustrate data pre-recorded in the control device 44, for determining by extrapolation the torrefaction time $t_r$ according to the torrefaction temperature $T_g$ and the final mass yield R sought (on dry basis).

For information, these data were obtained experimentally by means of the torrefaction unit 10 described above, by manually adjusting the torrefaction temperature $T_g$ and the torrefaction time $t_r$ during various tests, and each time measuring the mass yield R obtained at the end of torrefaction.

FIG. 3 relates to experiments conducted with particles having a mean diameter equal to 10 mm, whereas FIG. 4 relates to experiments conducted with particles having a mean diameter equal to 5 mm. In both cases, three torrefaction temperature values $T_g$ were tested, i.e. 300° C., 325° C. and 350° C.

These experiments made it possible to validate the formula used for calculating the reaction rate constant $k_r$, and thus the characteristic torrefaction reaction time, based on the kinetic model of Di Blasi and Branca as explained above. Indeed, the difference between the theoretical yield provided by this model and that measured experimentally is on average 4% for the 5 mm diameter particles, and 8% on average for the 10 mm particles.

Furthermore, a second thermocouple was used during these experiments. This thermocouple was arranged inside a biomass particle. A comparison between the temperature inside the particle measured using this thermocouple and the temperature of inert gas measured using the thermocouple 42 described above made it possible to determine experimentally the particle heating time. These measurements made it possible to validate the calculation of the characteristic heat transfer time explained above since the difference between this characteristic time and that measured experimentally represents on average 10% of the time measured experimentally for the 5 mm particles and on average 7% of the time measured experimentally for the 10 mm particles.

Furthermore, the graphs in FIGS. 3 and 4 demonstrate that the torrefaction can be conducted rapidly, in less than 9 minutes for both particle sizes tested, with a loss of mass of less than 30%.

Obviously, data based on a larger number of experiments may be recorded in the control device 44 so as to increase the precision of the calculation of the torrefaction time $t_r$.

Following experiments such as those described above, the torrefaction homogeneity in the biomass particles may be checked using measurements and compared to the results provided by the calculation described above.

Figure 5:
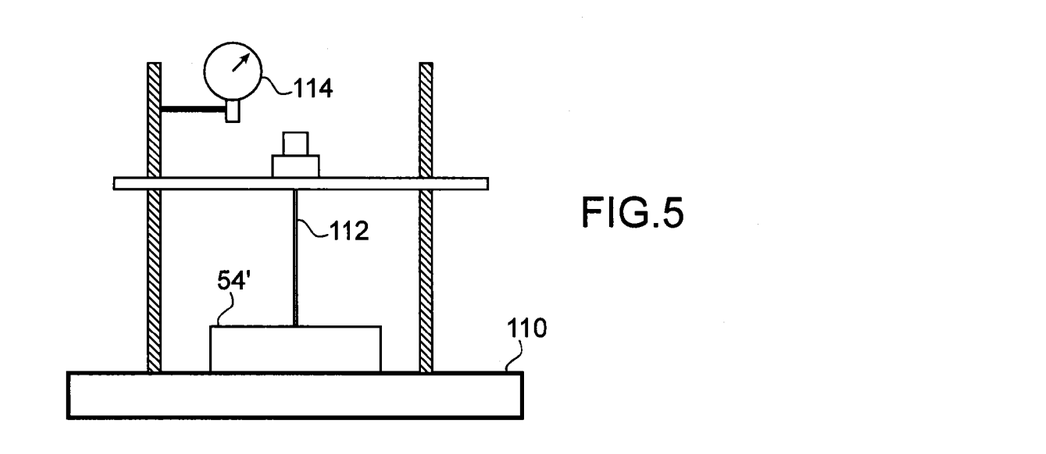
FIG. 5 is a partial schematic side view of a device for the experimental estimation of torrefaction homogeneity in torrefied biomass particles.

FIG. 5 illustrates an analysis device for conducting such measurements.

The principle of this analysis device is based on the penetration depth measurements, in the torrefied beech particles, of a punch subjected to a given stress.

The torrefied beech particles are previously cut so as to enable a measurement on a plane surface, in the core and on the periphery of the sample.

This sample 54' obtained in this way is kept stable on a metal part 110 by bonding. Firstly, the punch 112 is brought to the surface of the sample; a pre-stress, measured by a force sensor 114, is applied as a reference for the analyses, and a greater stress is applied and the resulting penetration depth of the punch 112 is measured using the comparator.

Figure 6:
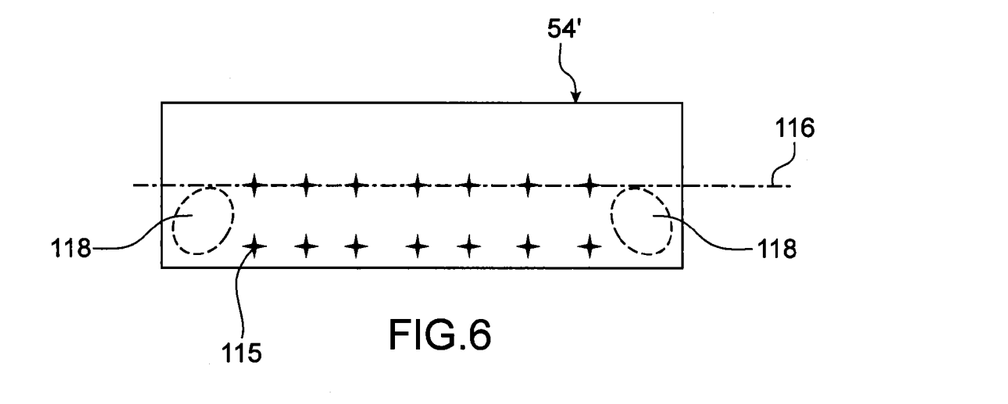
FIG. 6 is a schematic top view of a torrefied biomass particle, illustrating a measuring principle used by means of the device in FIG. 5.

This measurement is repeated at various points 115 along a median axis 116 of the sample (FIG. 6), i.e. "in the core", and on the periphery, 2 mm from the edge, so as to compare the effect of the heat treatment on the surface and in the core of the sample. A plurality of measurements may advantageously be made along the same axis to obtain a mean penetration depth value, and avoid heterogeneity of the sample material. These measurements should not be made on end zones 118 of the sample due to edge effects.

As a general rule, a particular application of the torrefaction devices and processes according to the invention to beech particles has been described above, but it is obvious that the invention may be applied to any type of biomass particles.

In particular, the invention may be applied to any types of wood, to any hardwoods, such as beech, but also to softwoods. Indeed, the latter have a lower reactivity than beech, and are thus suitable for obtaining high values of the ratio H representing the homogeneity of the torrefaction reaction more easily.

The invention claimed is:

1. A process for torrefying biomass particles or lignocellulosic particles $t_r$, $T_g$ in a torrefaction reactor, said process comprising:
    measuring a mean diameter $d_p$ of the biomass particles by a particle-diameter measurement device;
    receiving the mean diameter $d_p$ of the biomass particles at a computational device;
    according to the mean diameter $d_p$ of the biomass particles, computing by the computational device a maximum torrefaction temperature $T_g^{max}$ for which a ratio H of a characteristic torrefaction reaction time to a characteristic heat transfer time in the biomass particles is equal to a predefined minimum value $H^{min}$;
    setting a heater to maintain a torrefaction temperature $T_g$ of a fluid in said torrefaction reactor to a value less than or equal to said maximum torrefaction temperature $T_g^{max}$;
    setting a torrefaction time $t_r$ in said torrefaction reactor to a value such that a final mass yield R of the torrefaction is equal to a predefined target value; and
    torrefying the biomass particles in the fluid at the torrefaction temperature $T_g$ in the torrefaction reactor, during a time equal to the torrefaction time $t_r$.

2. The process according to claim 1, wherein the torrefaction temperature $T_g$ is set equal to said maximum torrefaction temperature $T_g^{max}$.

3. The process according to claim 1, wherein said predefined minimum value $H^{min}$ of said ratio H is greater than or equal to 2, or greater than or equal to 5, or greater than or equal to 10.

4. The process according to claim 1, wherein said predefined target value of the final mass yield R of the torrefaction is greater than or equal to 60%, or 70%, or 80%.

5. The process according to claim 1, wherein said torrefaction temperature $T_g$ is within a range of 300° C.-400° C., or a range of 300° C.-350° C., or a range of 325° C.-350° C.

6. The process according to claim 1, wherein said torrefaction time $t_r$ is less than 15 minutes, or less than 10 minutes, or less than 5 minutes.

7. The process according to claim 1, wherein said maximum torrefaction temperature $T_g^{max}$ is determined according to said minimum value $H^{min}$ of said ratio using the formula:

$$H^{min} = \frac{1/k_t}{\frac{\rho_p Cp_p d_p^2}{36\lambda_{eff,p}}}$$

wherein:
$k_t$ is a reaction rate constant for the torrefaction reaction, considered to be a first-order reaction;
$\rho_p$ is the volumetric mass density of the biomass;
$Cp_p$ is the specific heat of the biomass; and
$\lambda_{eff,p}$ is the effective thermal conductivity of the biomass.

8. The process according to claim 1, wherein said maximum torrefaction temperature $T_g^{max}$ is determined according to said minimum value $H^{min}$ of said ratio using the formula:

$$H^{min} = \frac{1/k_t}{\frac{\rho_p Cp_p d_p^2}{36\lambda_{eff,p}} + \min\left(\frac{\rho_p Cp_p d_p}{6h_{conv}}; \frac{\rho_p Cp_p d_p}{6\omega_p \sigma(T_g^{max} + T_p)(T_g^{max2} + T_p^2)}\right)}$$

wherein:
$k_t$ is a reaction rate constant for the torrefaction reaction, considered to be a first-order reaction;
$\rho_g$ is the volumetric mass density of the biomass;
$Cp_p$ is the specific heat of the biomass;
$\lambda_{eff,p}$ is the effective heat conductivity of the biomass;
$\omega_p$ is the emissivity of the biomass;
$h_{conv}$ is the external heat transfer coefficient between the biomass and said fluid;
$\sigma$ is the Stefan-Boltzmann constant; and
$T_p$ is the initial temperature of the biomass particles before torrefaction.

9. The process according to claim 8, wherein said external heat transfer coefficient $h_{conv}$ is determined using the Ranz-Marshall correlation, by the formula:

$$h_{conv} = \frac{\lambda_g}{d_p}(2 + 0.6 Re_p^{1/2} \cdot Pr^{1/2})$$

wherein:
$Re_p$ is the Reynolds number determined using the formula:

$$Re_p = \frac{\rho_g \times V_g \times d_p}{\mu_g};$$

Pr is the Prandtl number determined using the formula:

$$Pr = \frac{\mu_g \times Cp_g}{\lambda_g};$$

wherein:
$\rho_g$ is the volumetric mass density of the fluid;
$\mu_g$ is the viscosity of the fluid;
$\lambda_g$ is the thermal conductivity of the fluid;
$Cp_g$ is the specific heat of the fluid; and
$V_g$ is a velocity of the fluid relative to the biomass particles.

10. The process according to claim 1, wherein the torrefaction time $t_r$ is determined according to the torrefaction temperature $T_g$ and the predefined target value of the final mass yield R of the torrefaction, by predetermined experimental correlation data.

11. The process according to claim 1, wherein the mean diameter $d_p$ of the biomass particles is less than 40 mm, or less than 20 mm, or less than 10 mm.

12. The process according to claim 1, wherein the biomass consists of wood.

13. The process according to claim 1, wherein said fluid is an inert gas, or dinitrogen $N_2$.

14. A system for torrefying biomass particles or lignocellulosic particles $t_r$, $T_g$, the system comprising:
a torrefaction reactor;
a heater for heating a fluid in the torrefaction reactor; and
a control device including a particle-diameter measurement device configured to measure a mean diameter $d_p$ of the biomass particles and a computational device configured to receive the mean diameter $d_p$ of the biomass particles from the particle-diameter measurement device,
wherein
said computational device is configured to compute, according to the previously measured mean diameter $d_p$ of the biomass particles, a maximum torrefaction temperature $T_g^{max}$ for which the ratio H of a characteristic torrefaction reaction time to a characteristic heat transfer time in the biomass particles is equal to a predefined minimum value $H^{min}$;
said control device is configured to set the heater to maintain the fluid in the torrefaction reactor at a torrefaction temperature $T_g$ less than or equal to said maximum torrefaction temperature $T_g^{max}$;
said control device is configured to torrefy the biomass particles in said fluid during a torrefaction time $t_r$; and
said computational device is configured to compute the torrefaction time $t_r$ to be a value such that a final mass yield R of the torrefaction of the biomass particles is equal to a predefined value.

15. The system according to claim 14, wherein the control device is configured to preset said minimum value $H^{min}$ of said ratio H and/or to preset the final mass yield R of the torrefaction.

* * * * *

UNITED STATES PATENT AND TRADEMARK OFFICE
CERTIFICATE OF CORRECTION

PATENT NO. : 9,798,300 B2  
APPLICATION NO. : 14/367605  
DATED : October 24, 2017  
INVENTOR(S) : Timothee Nocquet et al.

Page 1 of 1

It is certified that error appears in the above-identified patent and that said Letters Patent is hereby corrected as shown below:

On the Title Page

Item (71), the Applicants' information are incorrect. Item (71) should read:

--(71) Applicants: COMMISSARIAT A L'ENERGIE ATOMIQUE ET AUX ENERGIES ALTERNATIVES, Paris (FR); CENTRE DE COOPERATION INTERNATIONALE EN RECHERCHE AGRONOMIQUE POUR LE DEVELOPPEMENT, Paris (FR)--

Signed and Sealed this
Tenth Day of July, 2018

Andrei Iancu
*Director of the United States Patent and Trademark Office*